United States Patent [19]
McLaughlin et al.

[11] Patent Number: 5,473,231
[45] Date of Patent: Dec. 5, 1995

[54] METHOD AND APPARATUS FOR CONTROLLING AN ELECTRIC ASSIST STEERING SYSTEM USING AN ADAPTIVE TORQUE FILTER

[75] Inventors: Kevin M. McLaughlin, Troy, Mich.; Stuart W. Parker, Redondo Beach, Calif.; Hristos K. Mantjios, Troy, Mich.

[73] Assignee: TRW Inc., Lyndhurst, Ohio

[21] Appl. No.: 241,053

[22] Filed: May 11, 1994

[51] Int. Cl.⁶ .................................. H02K 17/32
[52] U.S. Cl. .................. 318/433; 318/432; 180/79.1
[58] Field of Search ............................ 318/433, 432, 318/79.1, 79, 6.2

[56] References Cited

U.S. PATENT DOCUMENTS

| | | |
|---|---|---|
| 4,756,375 | 7/1988 | Ishikura et al. .................. 318/432 |
| 4,834,205 | 5/1989 | Massahiko et al. . |
| 4,951,207 | 8/1990 | Furukawa et al. . |
| 4,956,590 | 9/1990 | Phillips . |
| 4,989,682 | 2/1991 | Takahashi et al. . |
| 4,992,944 | 2/1991 | Noto et al. . |
| 5,053,966 | 10/1991 | Takahashi et al. . |
| 5,072,804 | 12/1991 | Bischof et al. . |

*Primary Examiner*—William M. Shoop, Jr.
*Assistant Examiner*—Karen Masih
*Attorney, Agent, or Firm*—Tarolli, Sundheim & Covell

[57] ABSTRACT

A steering assist system (10) providing assist in response to a steering control signal includes a vehicle speed sensor (56) for sensing vehicle speed and for providing a speed signal having a value indicative of the sensed vehicle speed and a torque sensor (44) operatively connected to a vehicle hand wheel (12) for providing a torque signal indicative of applied steering torque. A controller is connected to the vehicle speed sensor (56) and to the torque sensor (44). The controller includes an adaptive torque filter (80) that maintains a selectable system bandwidth independent of gain changes and vehicle speed changes. The adaptive filter (80) recovers any gain reduction by increasing the frequency of a filter pole.

20 Claims, 5 Drawing Sheets

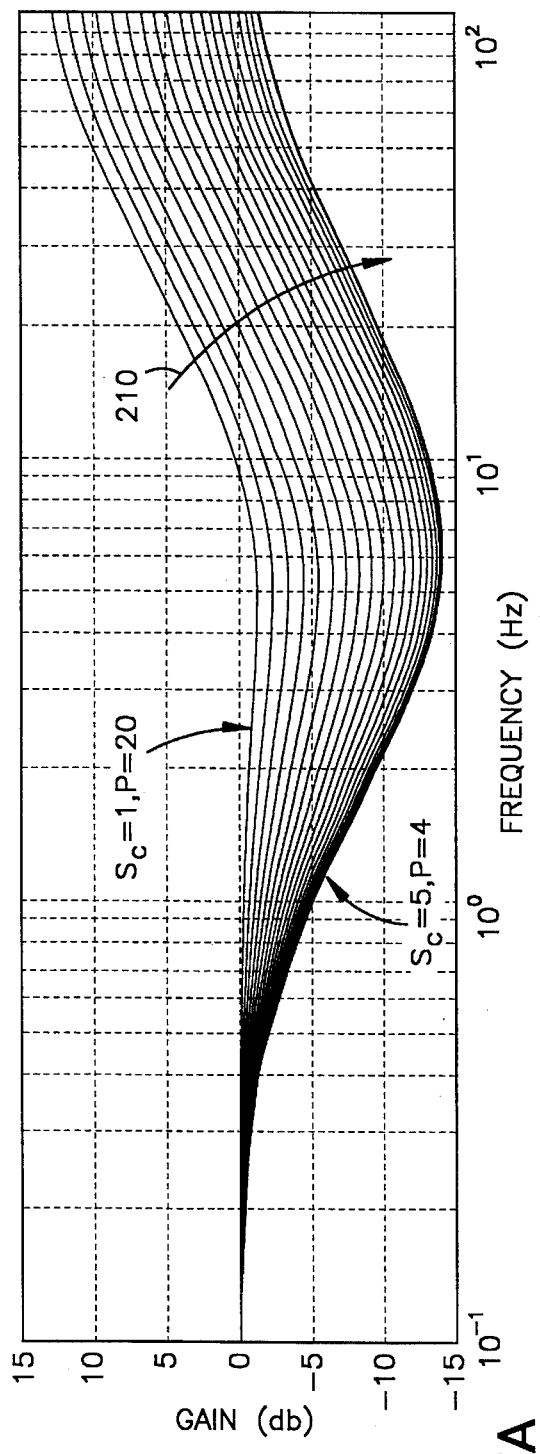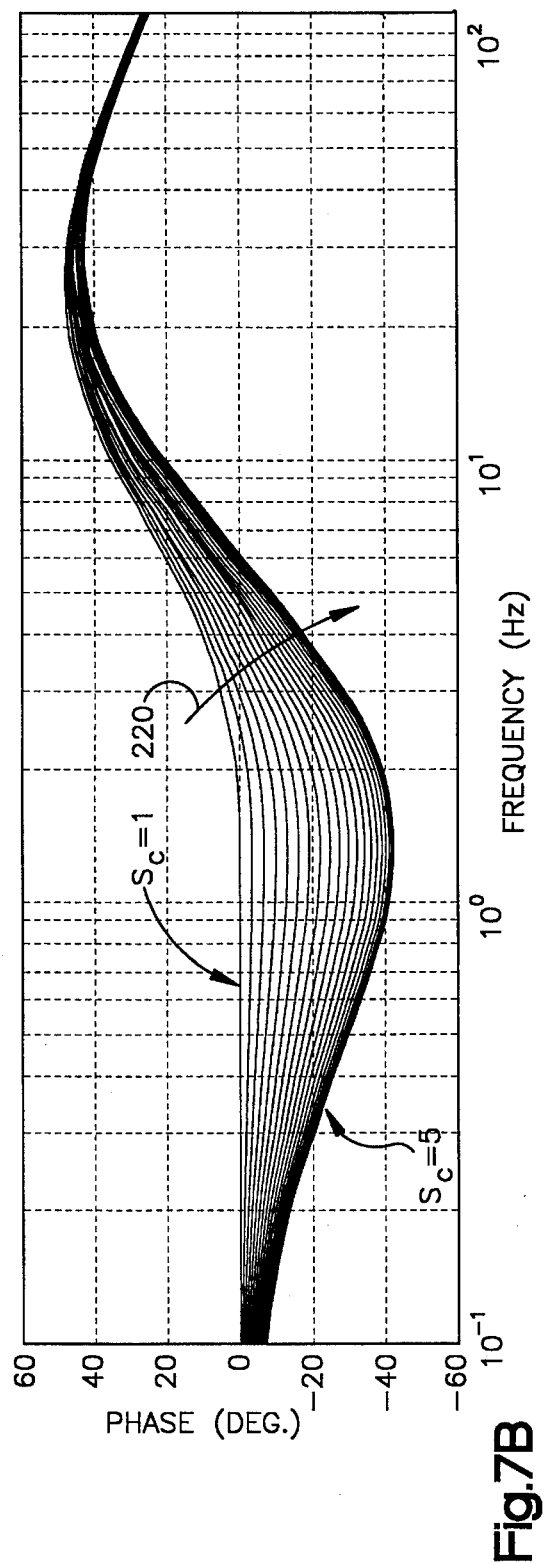
Fig.7A
Fig.7B

METHOD AND APPARATUS FOR CONTROLLING AN ELECTRIC ASSIST STEERING SYSTEM USING AN ADAPTIVE TORQUE FILTER

TECHNICAL FIELD

The present invention is directed to an electric assist steering system and is particularly directed to a method and apparatus for controlling an electric assist steering system to improve steering feel.

BACKGROUND OF THE INVENTION

Electric assist steering systems are well known in the art. Electric power assist steering systems that utilize a rack and pinion gear set provide power assist by using an electric motor to either (i) apply rotary force to a steering shaft connected to a pinion gear, or (ii) apply linear force to a steering member having the rack teeth thereon. The electric motor in such systems is typically controlled in response to (i) a driver's applied torque to the vehicle steering wheel, and (ii) sensed vehicle speed.

In U.S. Pat. No. 3,983,953, an electric motor is coupled to the input steering shaft and energized in response to the torque applied to the steering wheel by the vehicle operator. The steering system includes a torque sensor and a vehicle speed sensor. A computer receives the output signals provided by both the torque and speed sensors. The computer controls the amount of steering assist provided by the motor dependent upon both the applied steering torque and the sensed vehicle speed.

U.S. Pat. No. 4,415,054 to Drutchas (now U.S. Pat. No. Re. 32,222,), assigned to TRW Inc., utilizes a D.C. electric assist motor driven through an "H-bridge" arrangement. The assist motor includes a rotatable armature encircling a steering member. The steering member has a first portion with a thread convolution thereon and a second portion with straight cut rack teeth thereon. Rotation of the electric assist motor armature causes linear movement of the steering member through a ball-nut drivably connected to the thread convolution portion of the steering member. A torque sensing device is coupled to the steering column for sensing driver applied torque to the steering wheel. The torque sensing device uses a magnetic Hall-effect sensor that senses relative rotation between the input and output shafts across a torsion bar. An electronic control unit ("ECU") monitors the signal from the torque sensing device and controls the electric assist motor in response thereto. A vehicle speed sensor provides a signal to the ECU indicative of the vehicle speed. The ECU controls current through the electric assist motor in response to both the sensed vehicle speed and the sensed applied steering torque. The ECU decreases steering assist as vehicle speed increases. This is commonly referred to in the art as speed proportional steering.

U.S. Pat. No. 4,660,671 discloses an electric controlled steering system that is based on the Drutchas steering gear. In the arrangement shown in the '671 patent, the D.C. motor is axially spaced from the ball-nut and is operatively connected thereto through a connection tube. The electronic controls includes a plurality of diagnostic features that monitor the operation of the steering system. If an error in the operation of the electric steering system is detected, the power assist system is disabled and steering reverts to an unassisted mode.

U.S. Pat. No. 4,794,997 to North, assigned to TRW Cam Gears Limited, discloses an electric assist steering system having an electric motor operatively connected to the rack through a ball nut. A vehicle speed sensor and an applied steering torque sensor are operatively connected to an ECU. The ECU controls electric current through the motor as a function of both applied steering torque and sensed vehicle speed. The current is controlled by controlling the pulse-width-modulated ("PWM") signal applied to the motor. As the PWM increases, power assist increases. The ECU or computer is preprogrammed with discrete control curves that provide steering assist values (PWM values), also referred to as torque-out values, as a function of applied steering torque, also referred to as torque-in values, for a plurality of predetermined discrete vehicle speed values. Each vehicle speed value as an associated torque-in vs. torque-out control curve.

U.S. Pat. No. 5,257,828 To Miller et al., discloses an electric assist steering system having yaw rate control. This system uses a variable reluctance motor to apply steering assist to the rack member. The torque demand signal is modified as a function of the steering rate feedback.

Known electric assist steering systems have a dynamic performance characteristic, known as the system bandwidth, that varies as a function of vehicle speed. As the vehicle operator applies steering torque and rotates the steering wheel back-and-forth, e.g., left-to-right-to-left, the electric assist motor is energized to provide steering assist commensurate with the steering inputs. How the steering system responds to a particular frequency of back-and-forth steering wheel movement is indicative of the system's dynamic performance.

The amount of local change at the electric assist motor divided by the amount of local change in steering torque applied by the driver is the steering system gain. A time delay occurs from the time steering torque is applied to the steering wheel to the time the assist motor responds. This time delay is a function of the frequency at which the input command is applied. This is referred to as the system response time. The system gain is set to a predetermined value so as to have a short system response time while still maintaining overall system stability. The system response time and system gain determine the system bandwidth.

The bandwidth in known steering systems varies as a function of vehicle speed. If dynamic steering frequency or the "frequency" of a transient response exceeds the system bandwidth at a particular vehicle speed, the steering feel becomes "sluggish" (felt as a "hesitation" when the steering wheel direction is changed) since the steering assist motor can not respond quick enough. Typically, steering system gain as well as system bandwidth decreases as the vehicle speed increases so that system hesitation or sluggishness becomes more noticeable as vehicle speed increases.

SUMMARY OF THE PRESENT INVENTION

The present invention is directed to a method and apparatus for controlling an electric assist steering system so as to have a system bandwidth independent of vehicle speed and input torque.

In accordance with the present invention, an apparatus is provided for controlling a steering assist system. The steering assist system provides assist in response to a steering control signal. The apparatus comprises torque sensing means operatively connected to a vehicle hand wheel for providing a torque signal indicative of applied steering torque. Steering assist means provides steering assist in response to a control signal. The apparatus further includes control means operatively connected to the torque sensing means for providing the control signal to the steering assist means in response to the torque signal. The control means includes torque filtering means for filtering the torque signal so as to maintain a selectable system bandwidth during system operation.

In accordance another aspect of the present invention, a method is provided for controlling a steering assist system that provides steering assist in response to a steering control signal. The method comprises the steps of measuring applied steering torque. The method further comprises filtering the torque signal so as to maintain a selectable steering assist system bandwidth during system operation. The method also provides the control signal in response to the filtered torque signal.

In accordance yet another aspect of the present invention, a method is provided for designing an adaptive filter for an electric assist steering system having a torque sensor connected to a controller which is, in turn, connected to an electric assist motor. The method comprises the steps of applying a command signal to an electric assist motor in an open loop configuration, measuring an open loop transfer function as a result of the applied command signal to the motor, determining the maximum assist curve gain, and designing a filter such that the open loop transfer function of the steering system has a predetermined (i) open loop crossover frequency, (ii) gain stability margin, and (iii) phase stability margin.

BRIEF DESCRIPTION OF THE DRAWINGS

Other features and advantages of the present invention will become apparent to those skilled in the art to which the present invention relates from a reading of the following detailed description with reference to the accompanying drawings, in which:

FIGS. 7A and 7B are a Bode plot of the adaptive filter of the present invention for various steering system gains.

DESCRIPTION OF PREFERRED EMBODIMENT

Figure 1:
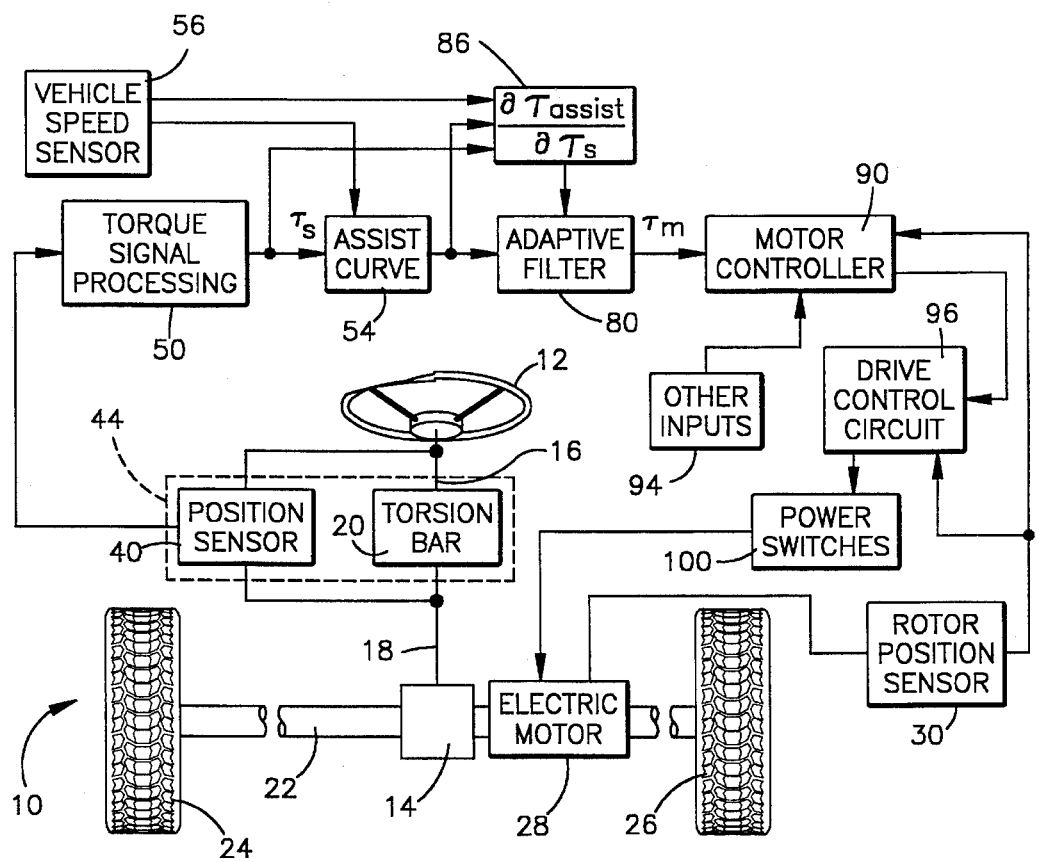
FIG. 1 is a schematic block diagram illustrating a power assist steering system in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to an output shaft 18. The input shaft 16 is operatively coupled to the output shaft 18 through a torsion bar 20.

The torsion bar 20 twists in response to applied steering torque thereby permitting relative rotation between the input shaft 16 and the output shaft 18. Stops, not shown, limit the amount of such relative rotation between the input and output shafts in a manner known in the art. The torsion bar 20 has a spring constant referred to herein as $K_t$. In accordance with a preferred embodiment, the spring constant $K_t$=20 in/lbs. The amount of relative rotation between the input shaft 16 and the output shaft 18 in response to applied steering torque is functionally related to the spring constant of the torsion bar.

As is well known in the art, the pinion gear 14 has helical teeth which are meshingly engaged with straight cut teeth on a rack or linear steering member 22. The pinion gear 14 in combination with the straight cut gear teeth on the rack member 22 form a rack and pinion gear set. The rack is steerably coupled to the vehicle's steerable wheels 24, 26 with steering linkage in a known manner. When the steering wheel 12 is turned, the rack and pinion gear set converts the rotary motion of the steering wheel 12 into linear motion of the rack 22. When the rack moves linearly, the steerable wheels 24, 26 pivot about their associated steering axes and the vehicle is steered.

An electric assist motor 28 is drivingly connected to the rack 22 through a ball-nut drive arrangement also known in the art. Such an arrangement is fully described in U.S. Pat. No. 5,257,828 to Miller et al., assigned to TRW Inc., which is hereby fully incorporated herein by reference. When the electric motor 28 is energized, it provides power assist steering so as to aid in the rotation of the vehicle steering wheel 12 by the vehicle operator.

In accordance with a preferred embodiment of the present invention, the electric assist motor 28 is a variable reluctance motor. A variable reluctance motor is desirable for use in an electric assist steering system because of its small size, low friction, and its high torque-to-inertia ratio. The motor 28, in accordance with a preferred embodiment of the present invention, includes eight stator poles and six rotor poles. The stator poles are arranged so as to be energized in pairs designated Aa, Bb, Cc, and Dd.

The operation of a variable reluctance motor and its principle of operation are well known in the art. Basically, the stator poles are energized in pairs. The rotor moves so as to minimize the reluctance between the stator poles and the rotor poles. Minimum reluctance occurs when a pair of rotor poles are aligned with the energized stator poles. Once minimum reluctance is achieved, i.e., when the rotor poles align with the energized stator coils, those energized stator coils are de-energized and an adjacent pair of stator coils are energized.

The direction of motor rotation is controlled by the sequence in which the stator coils are energized. The torque produced by the motor is controlled by the current through the stator coils. When the motor is energized, the rotor turns which, in turn, rotates the nut portion of the ball-nut drive arrangement. When the nut rotates, the balls transfer a linear force to the rack. The direction of rack movement is dependent upon the direction of rotation of the motor.

A rotor position sensor 30 is operatively connected to the motor rotor and to the motor housing. The above-incorporated '828 patent shows and describes such a rotor position sensor 30 in detail, the description of which being hereby fully incorporated herein by reference. One of the functions of the rotor position sensor 30 is to provide an electrical signal indicative of the position of the rotor relative to the motor stator. For proper operation of the variable reluctance motor, including direction of rotation and applied torque, it is necessary to know the position of the rotor relative to the stator.

A position sensor 40 is operatively connected across the input shaft 16 and the output shaft 18 and provides an electrical signal having a value indicative of the relative rotational position or relative angular orientation between the input shaft 16 and the output shaft 18. The position sensor 40 in combination with the torsion bar 20 form a torque sensor 44. The steering wheel 12 is rotated by the driver during a steering maneuver through an angle $\Theta_{HW}$. The relative angle between the input shaft 16 and the output shaft 18 as a result of applied input torque is referred to herein as $\Theta_P$. Taking the spring constant $K_t$ of the torsion bar 20 into account, the electrical signal from the sensor 40 is also indicative of the applied steering torque referred to herein as $\tau_s$.

The output of the torque sensor 44 is connected to a torque signal processing circuit 50. The processing circuit 50 monitors the angle $\Theta_p$ and, "knowing" what the spring constant $K_t$ of the torsion bar 20 provides an electric signal indicative of the applied steering torque $\tau_s$. The torque signal $\tau_s$ is connected to an assist curve circuit 54.

The assist curve circuit 54 is preferably a look-up table that provides a desired torque assist signal $\tau_{assist}$ having a value functionally related to the applied steering torque $\tau_s$ and sensed vehicle speed. A vehicle speed sensor 56 is also operatively connected to the assist curve circuit. This speed proportional gain curve function may be accomplished using a look-up table in a microcomputer or may be accomplished using an actual calculation in accordance with a desired control function.

Figure 3:
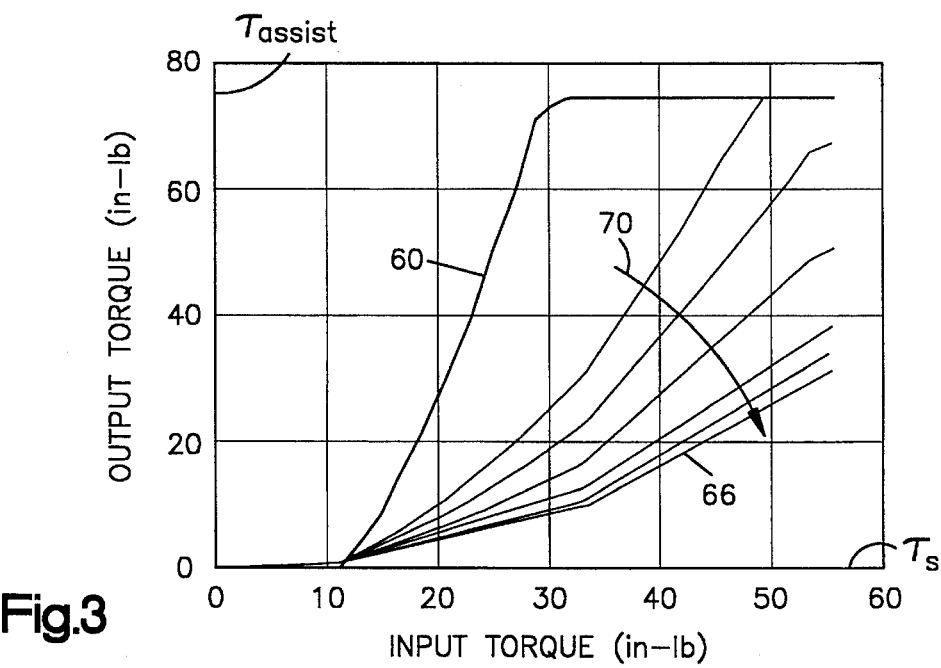
FIG. 3 is a graphical representation of torque-in vs. torque-out control curves that vary as a function of vehicle speed.

As is well known in the art, the amount of power assist desired for a vehicle steering system decreases as vehicle speed increases. Therefore, to maintain a proper or desirable feel to steering maneuvers, it is desirable to decrease the amount of steering power assist as the vehicle speed increases. FIG. 3 shows preferred values of output torque $\tau_{assist}$ verses applied input torque $\tau_s$ for various vehicle speeds. Line 60 is the torque-in vs. torque-out values for what is referred to in the art as dry surface parking. Line 66 is the torque-in vs. torque-out values for high vehicle speeds. Line 70 shows the direction of how values change as vehicle speed increases. Generally, the value of the output from the assist curve circuit 54 is referred to as $\tau_{assist}$.

The output $\tau_{assist}$ of the assist curve circuit 54, which is an electric signal indicative of the desired output torque, is connected to an adaptive torque filter 80. The output $\tau_{assist}$ is also connected to a slope detecting circuit 86. The slope detecting circuit determines the slope of the $\tau_{assist}$ value as a function of the applied input torque $\tau_s$. The output of the slope detecting circuit 86, referred to as $S_c$, can be expressed as:

$$S_c = \frac{\partial \tau_{ASSIST}}{\partial \tau_s}$$

The slope detecting circuitry is capable of computing both the instantaneous slope of the assist curve in real time based on the input torque $\tau_s$, and computing the maximum assist curve gain for the present vehicle speed. Vehicle speed is also shown as an input to the slope detecting circuitry 86. The slope detecting circuitry is also capable of outputting a filtered slope of the assist curve. This filtered slope is computed by passing the instantaneous slope of the assist curve through a first order filter with a pole between 1 and 20 Hz. The slope detecting circuitry has three inputs: (i) input torque $\tau_s$, (ii) assist torque $\tau_{assist}$, and (iii) vehicle speed. The slope detecting circuitry has three outputs: (i) the instantaneous slope of the assist curve, (ii) the filtered slope of the assist curve, and (iii) the maximum slope of the assist curve at any speed.

The output from the slope detecting circuit 86 is connected to the adaptive torque filter 80.

The adaptive filter outputs a filtered torque signal $\tau_m$, referred to as the torque demand signal, that is connected to a motor controller 90. The motor controller 90 controls energization of the motor 28 in response to the torque command signal $\tau_m$. The rotor position sensor 30 is also connected to the motor controller 90. The motor controller 90 controls steering damping in response to sensed rotor speed, as is fully described in the above-incorporated '828 patent. Other inputs 94 are connected to the motor controller 90. These other inputs 94 include an ECU temperature sensor, soft-start circuitry, etc. These other inputs are also fully described in the above-incorporated '828 patent.

The output of the motor controller 90 is connected to a drive control circuit 96. The drive control circuit is controllably connected to a plurality of power switches 100 to control the application of electrical energy to the electric assist motor 28. The output from the rotor position sensor 30 is also connected to the drive control circuit 96. As mentioned above, control of a variable reluctance motor requires that the relative position between the rotor and the stator be known.

Figure 2:
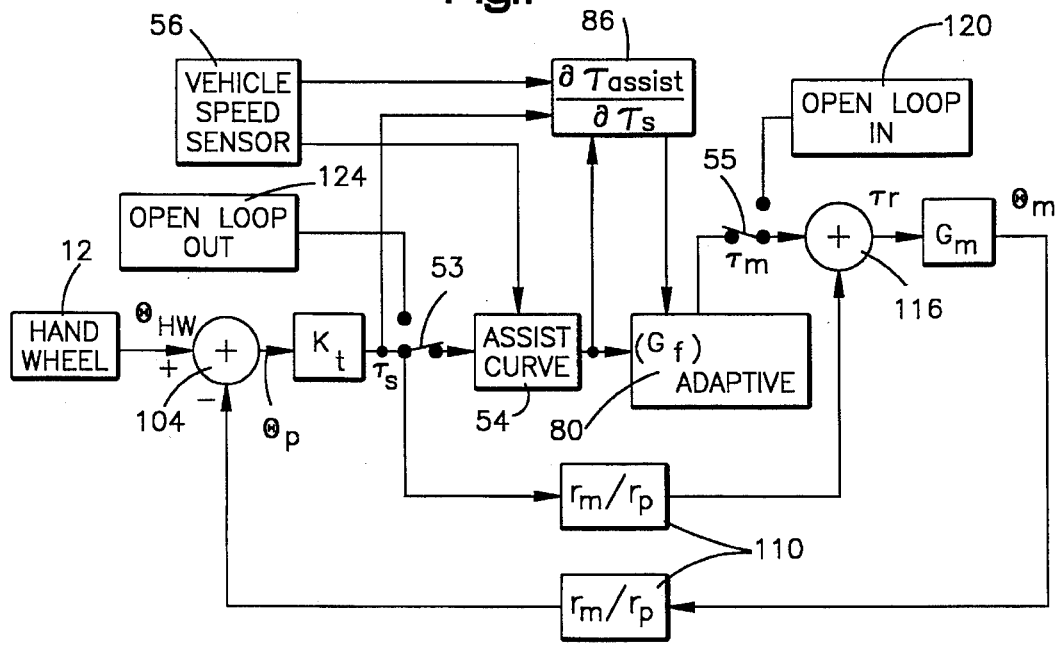
FIG. 2 is a schematic drawing representation of the linearized closed loop control system in accordance with the present invention.

Referring to FIG. 2, the linearized closed loop control system of the present invention is shown. Rotation of the hand wheel 12 results in an angular displacement of $\Theta_{HW}$ on the steering wheel side of the torsion bar position sensor. This angular displacement is differenced 104 with the resultant angular displacement of the output shaft 18 after it is driven in rotation by the electric assist motor by an angle $\Theta_m$ through the gearing ratio 110 represented by $r_m/r_p$ where $r_m$ is the effective radius of the motor ball nut and $r_p$ is the effective radius of the pinion. In one embodiment of the present invention, the values are $r_m = 0.05$ in. and $r_p = 0.31$ in. One radian of rotation of the ball nut produces $r_m$ inches of travel of the rack. Similarly, one radian of rotation of the pinion produces $r_p$ inches of travel of the rack. The resultant angular displacement $\Theta_p$ times the spring constant $K_t$ gives the torque signal $\tau_s$. In the closed loop arrangement, switch 53 connects the output $\tau_s$ to the assist curve circuit 54. The torque curves provide the torque request value $\tau_{ASSIST}$ as a function of the torque signal $\tau_s$ and the measured vehicle speed 56. Preferably, the $\tau_{ASSIST}$ value is determined according to:

$$\tau_{assist} = S_p \times (LS) + (1 - S_p) \times (HS)$$

where LS is the set of lowest speed $\tau_{ASSIST}$ values for a given input torque, HS is the set of highest speed $\tau_{ASSIST}$ values for a given input torque, and $S_P$ is a speed proportional term that varies between 1 at parking speed and 0 at a predetermined high speed. This provides a smooth interpolation of values as vehicle speed increases. This determination of the $\tau_{ASSIST}$ value is fully described in co-pending patent application Ser. No. 08/212,112 to McLaughlin et al., filed Mar. 11, 1994, and is hereby fully incorporated herein by reference.

The adaptive torque filter 80, in accordance with a preferred embodiment of the present invention, has a transfer function $(G_f)_{adaptive}$ which can be expressed as:

$$(G_f)_{adaptive} = \frac{P}{S+P} \times \frac{(S+40)^2}{S+400} \times \frac{1}{4}$$

where P is an adaptive pole dependent on assist gain. Note that the zero frequency gain or "DC gain" is one so that the local slope of the assist curve $S_c$ is the dominant term in determining the gain of the steering system once the mechanical parameters, such as $r_m$, $r_p$, $G_m$ etc. have been defined. The output from the adaptive torque filter 80 is a torque command signal $\tau_m$. In the closed loop arrangement, switch 55 connects $\tau_m$ to the summing circuit 116. The motor provides a torque assist $\tau_m$ which is summed with the manual assist transmitted through the pinion shaft producing a total torque on the rack. This torque is applied to the transfer function $G_m$ which represents the dynamics of the steering gear. The input to $G_m$ is the total torque applied to the motor via the rack and ball nut from the input pinion and the motor and the output is the motor rotation angle. The transfer function $G_m$ is referenced directly to the motor so that the input is the total torque on the motor and the output is motor angle. The restoring force applied by the tires on the rack is modeled as a spring force which is not shown because it is internal to $G_m$.

If the filter $G_f$ is a constant filter in which the poles do not change, the system bandwidth is a direct function of the local gain of the assist curve. If the local assist gain is high, such as during dry park where a small input torque change produces a large output torque, the system will have high bandwidth and will be very responsive. However, if the local assist gain is low, such as occurs at high vehicle speed when large input torque changes are required to produce large output torques, the system will have low bandwidth and will not be adequately responsive.

Figure 5A:
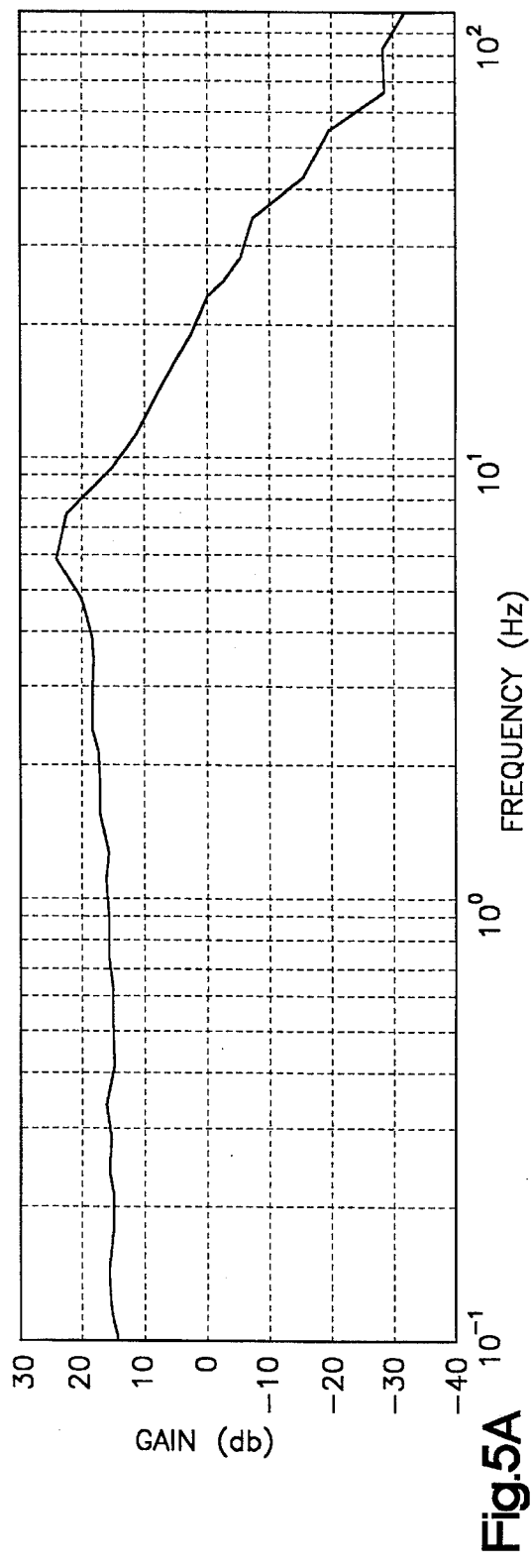
FIGS. 5A and 5B are a Bode plot of an open loop system.
Figure 5B:
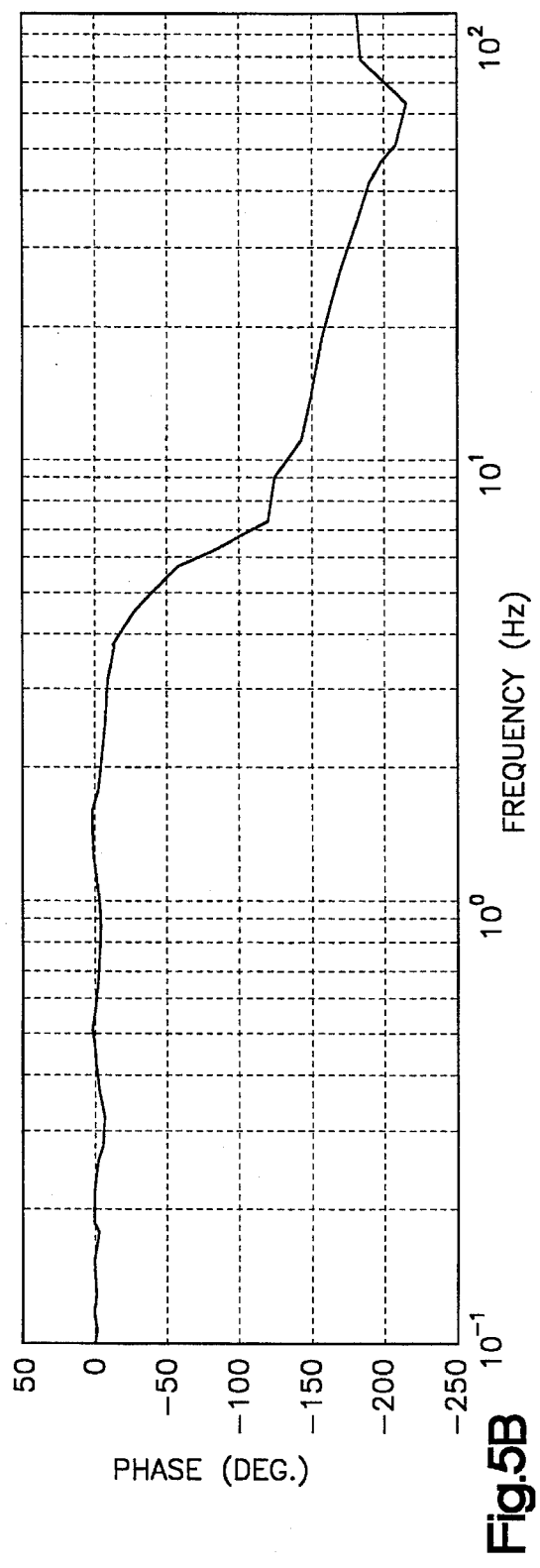

To determine what torque filter should be used, the open loop transfer function must first be determined. The open loop transfer function, for the purposes of this application, occurs when the motor command $\tau_m$ is used as the input and the measured torque sensor signal $\tau_s$ is the output. To establish such an open loop system, switches 53 and 55 are switched so as to remove the assist curves and the adaptive torque filter from the system. The transfer function is measured on a vehicle for a particular system using a known signal analyzer to command the motor at various input frequencies and measuring the output of the torque sensor with the hand wheel held in a fixed position. This measured transfer function is designated as $G_p$, and an example of such is shown in FIGS. 5A and 5B. (The actual values are dependent upon the particular vehicle application.) This measured open loop transfer function is then used to design a torque filter so that the steering torque loop has a desired stability and performance characteristics.

One skilled in the art will appreciate that the open loop transfer function $G_p$ can also be computed by creating a linear model of the dynamics of the rack, tires, motor, ball nut, electronics, etc. If $G_p$ is computed from an analytical model, then all of the dynamics involved in converting a torque command at the motor to a measured torsion bar signal must be included in the model. It is preferred to measure this transfer function directly as analytical models rarely match real world phenomenon exactly especially with regard to the phase angle of the transfer function.

To design the torque filter, the open loop transfer function $G_p$ is first multiplied by the highest local assist curve gain $S_c$. A filter is then designed for the open loop system ($S_c \times G_p$) to achieve performance and stability requirements. For example, assume the maximum assist curve gain is 5. One skilled in the art will appreciate from FIGS. 5A and 5B that if a gain of 5 (or 14 db) is added to the gain portion of the Bode plot, the system will have insufficient stability margins. Therefore a filter is added to the open loop system to achieve desired performance and stability objectives. In accordance with a preferred embodiment, a filter of the form:

$$G_f = \frac{(S+40)^2}{(S+4) \times (S+400)}$$

is used. The filter $G_f$ is a lag-lead type filter that is designed to provide a system with adequate performance and stability margins at a maximum steering system gain of 5. It can be seen from FIGS. 4A and 4B that for a gain of $S_c$=5, the system has approximately 10 db of gain margin, and 35 degrees of phase margin. The open loop transfer function shown includes three quantities that describe the behavior or the open loop steering system: (i) the local assist curve gain $S_c$, (ii) the torque filter $G_f$, and (iii) the measured transfer function $G_p$.

Figure 4A:
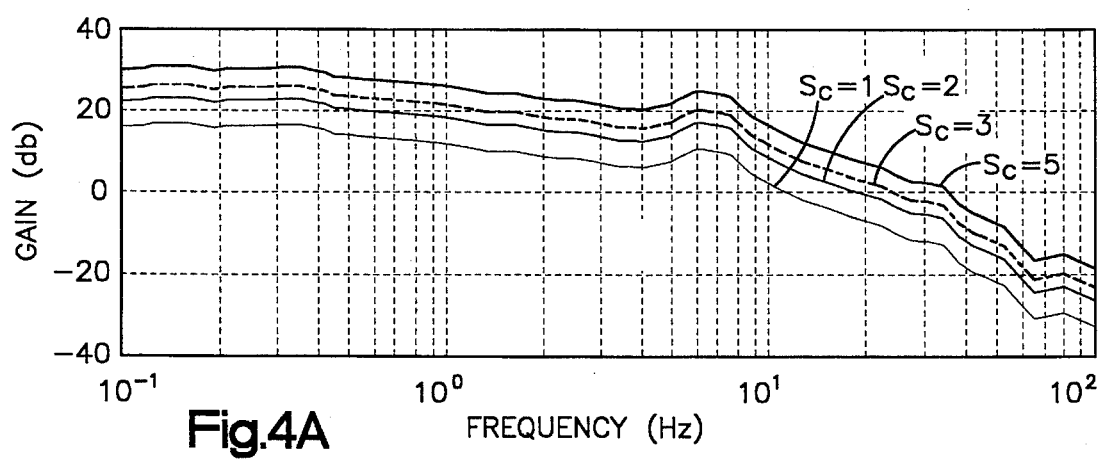
FIGS. 4A and 4B are a Bode plot of an open loop system using a fixed torque filter.
Figure 4B:
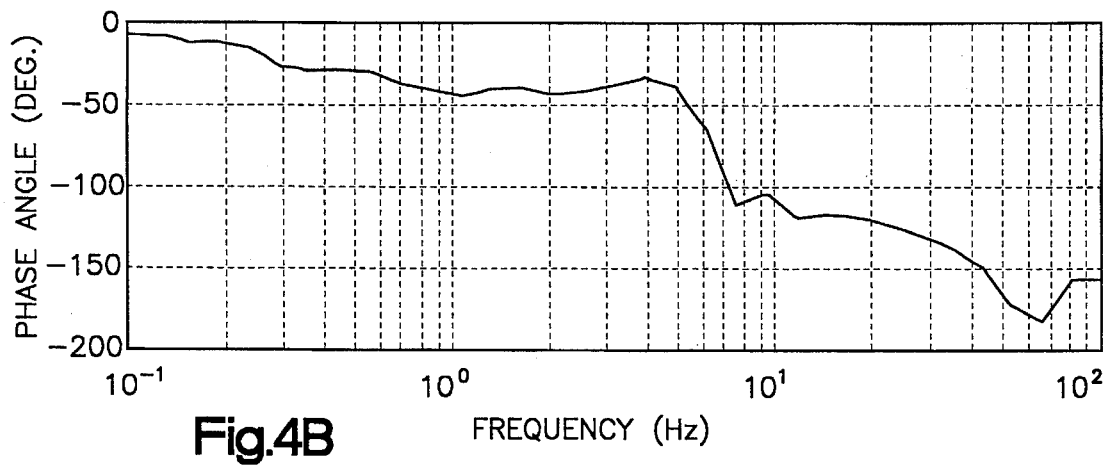

FIGS. 4A and 4B are the Bode plots for the open loop system for four different gains $S_c$=1, $S_c$=2, $S_c$=3, and $S_c$=5 as would occur with a constant filter $G_f$ as follows:

$$G_f = \frac{(S+40)^2}{(S+4) \times (S+400)}$$

As the gain decreases from 5 to 1, the 0 db crossover point also decreases indicating a reduction in closed loop bandwidth and loss of system responsiveness. Even if a high bandwidth system has adequate stability margins for the maximum assist gain $S_c$ of 5, gain $S_c$ decreases at high vehicle speeds and when the steering assist is initiated by moving out of the deadband, results in a system performance that will be sluggish and exhibit a hesitation. The solution to this problem is to design a different filter or to have the filter "adapt" to gain changes in real time so that adequate performance is achieved at all assist curve gains.

It is a goal of the adaptive torque filter to control the system bandwidth independently as vehicle speed and system gain changes so as to improve the steering feel. This is accomplished using the derivative or slope of assist curves with respect to the input torque $\tau_s$ to compute the poles and zeros of an adaptive filter. In essence, it is desired to have the poles and zeros of the torque filter to change or adapt to the varying levels of torque assist. The filter can have any number of poles and zeros, and can have a combination of fixed and adaptive poles and zeros.

Figure 6A:
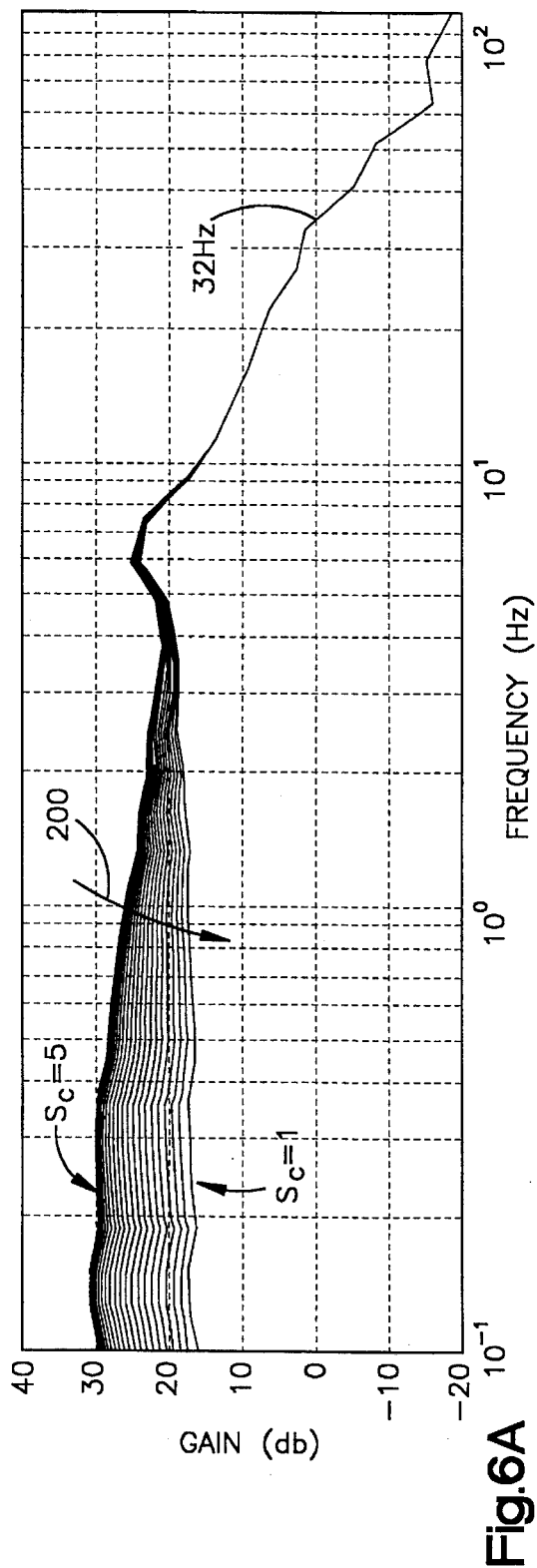
FIGS. 6A and 6B are a Bode plot of an open loop system using an adaptive torque filter.
Figure 6B:
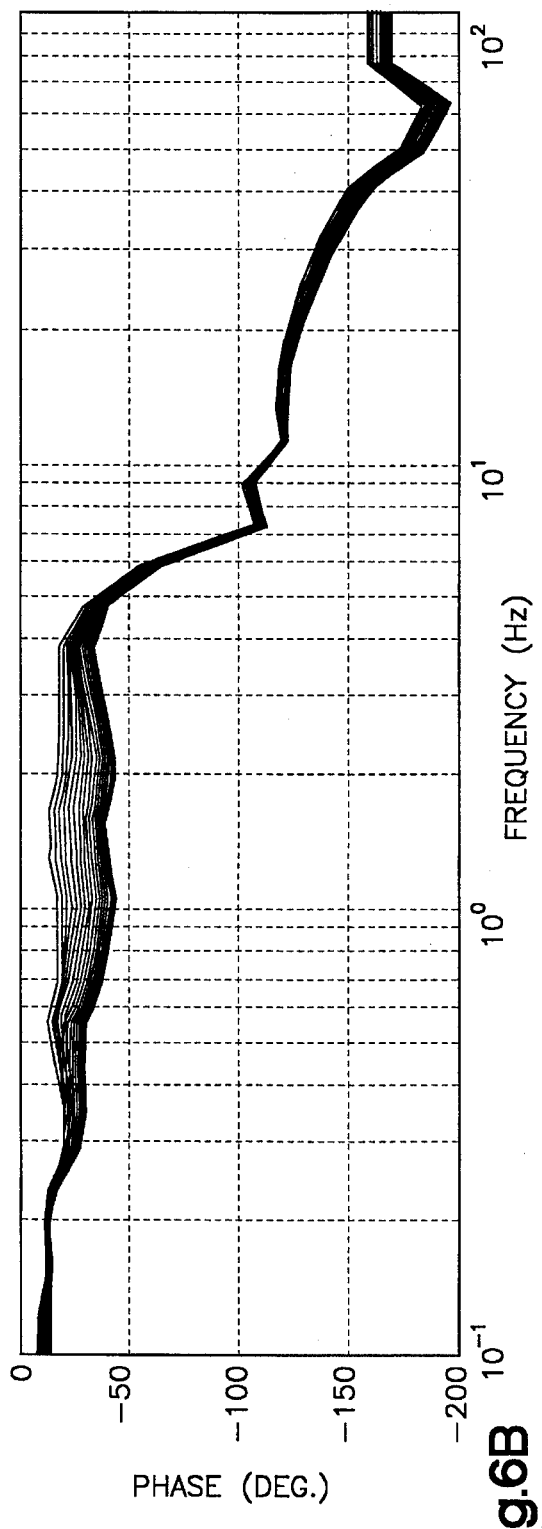

FIGS. 6A and 6B show the Bode plot of the open loop steering system including the gain $S_c$ and the adaptive torque filter where the adaptive torque filter $(G_f)_{adaptive}$ of a preferred embodiment of the present invention is:

$$(G_f)_{adaptive} = \frac{P}{S+P} \times \frac{(S+40)^2}{S+400} \times \frac{1}{4}$$

where P is the adaptive pole. The open loop steering system Bode plot is shown for an entire set of steering system gains between 1 and 5. Those skilled in the art will appreciate that all of the filters crossover the 0 db point at nearly the exact same frequency. This implies that the closed loop system will posses the same bandwidth regardless of the local assist gain. The gain and phase margins of the system with the adaptive filter are adequate. In the preferred embodiment of the invention, the 0 db crossover point is made the same for all assist curve gains. The 0 db crossover point need not be the same and can be selectable by modifying the adaptive pole location as a function of assist gain.

The adaptive filter $(G_f)_{adaptive}$ can be rewritten as:

$$(G_f)_{adaptive} = \frac{(S+40)^2}{(S+4)(S+400)} \times \frac{(S+4)}{(S+P)} \times \frac{P}{4}$$

where the nominal filter $G_f$ is:

$$G_f = \frac{(S+40)^2}{(S+4) \times (S+400)}$$

and the adaptive portion of the filter $G_1$ is:

$$G_1 = \frac{(S+4)}{(S+P)} \times \frac{P}{4}$$

This realization of $(G_f)_{adaptive}$ still has unity DC gain, so the DC gain of the open loop system is still determined by $S_c$.

It has been found that Pole location can be as follows:

| ASSIST GAIN $S_c$ | POLE LOCATION P |
|---|---|
| 5 | 4 |
| 3 | 6.67 |
| 2 | 10 |
| 1 | 20 |

To determined the closed form solution of P, in accordance with a preferred embodiment of the present invention, assume that the nominal filter (a filter designed for the high gain case) has a low order pole with time constant $1/P_1$ for a nominal gain of $S_{c1}$. The time constant of a first order filter is defined as the reciprocal of the pole. Using the equation of the nominal filter $G_f$ for the high gain case of $S_c=5$:

$$G_f = \frac{(S+40)^2}{(S+4) \times (S+400)}$$

the values of $1/P_1$ and $S_{c1}$ are $1/P_1=\frac{1}{4}$ and $S_{c1}=5$ because the gain is 5 and the low order pole is a 4 rad/sec. It is desirable for any assist gain of $S_c$ to calculate a pole location P such that the gain reduction at the crossover frequency $w_c$ induced by $S_c$ is made up by a gain increase from P. This can be expressed as:

$$-20 \log_{10}(1 + w_c^2 T_1^2)^{1/2} =$$

$$-20 \log_{10}(1 + w_c^2 T^2)^{1/2} + 20 \log_{10} \frac{S_c}{S_{c1}}$$

The left hand side of the equation is the gain at frequency $w_c$ due to a pole with time constant $T_1 = 1/P_1$. The first term on the right hand side is the gain at frequency $w_c$ due to a pole with time constant $T = 1/P$. The last term is the gain change due to the assist gain being $S_c$ rather than $S_{c1}$. This equation can be expressed as:

$$\frac{(1 + w_c^2 T^2)^{1/2}}{(1 + w_c^2 T_1^2)^{1/2}} = \frac{S_c}{S_{c1}}$$

Solving for $(T)^2$, we get:

$$T^2 = S_c^2 \left( \frac{1 + w_c^2 T_1^2}{S_{c1}^2 w_c^2} \right) - \frac{1}{w_c^2}$$

This equation can be written as:

$$T^2 = S_c^2 a + b$$

where a and b are constant terms computed as:

$$a = \frac{(1 + w_c^2 T_1^2)}{(S_{c1} w_c^2)}$$

$$b = -\frac{1}{w_c^2}$$

Those skilled in the art will appreciate that the above-equation shows that the reciprocal of the pole location squared is a linear function of the local assist curve gain squared. If
$w_c = 32 \times 2\pi$, $1/P_1 = \frac{1}{4}$, and $S_{c1} = 5$, then
$a = 2.5009 \ 10^{-3}$ and
$b = 2.473 \ 10^{-5}$.

The frequency $w_c$ is chosen to be 32 Hz because this is the open loop crossover point of the steering system using $S_c=5$ and the nominal filter $G_f$. FIGS. 6A and 6B show the Bode plot for the open loop steering system transfer function $S_c G_p (G_f)_{adaptive}$ for the assist curve gains between 1 and 5. Arrow 200 shows the direction of decreasing gain.

Those skilled in the art will appreciate that the filters $G_1$ and $G_f$ are realized in a digital computer as digital filters using pole-zero mapping. Basically, the poles P and zeros Z of the continuous system are mapped to the poles p and zeros z of the discrete digital filter via:
$p = \exp(Pt)$, and $z = \exp(Zt)$,
where exp is the natural exponent and t is the sample rate. The sample rate of the digital filters, in accordance with one embodiment of the present invention, is approximately 300 micro-seconds. With pole zero mapping, the digital filter is then "forced" to have the same gain DC as the continuous filter.

At least three implementations of the adaptive filtering technique are possible using the three different outputs of the slope detecting circuit 86:

1) The instantaneous local gain of the assist curve $S_c$ is calculated at the sample rate of the filter. In accordance with one embodiment, $S_c$ is calculated every 300 microseconds. The pole P is also calculated every 300 microseconds.

2) The filtered slope of the assist curve is used to compute the adaptive pole P. In this case, the rate of change of the pole P is limited by the pole of the first order filter through which the instantaneous slope is filtered. The instantaneous pole is filtered through a first order filter with a pole between 1 and 20 Hz.

3) The maximum local gain of the assist curves are calculated at each vehicle speed. Based on the maximum assist gains, the poles of the adaptive filter are computed based on the maximum gain at each vehicle speed. The adaptive filter then becomes a function of speed because the poles change only with speed.

The design of the adaptive filter is accomplished using the following steps:
1) Measure the open loop transfer function from the motor command $\tau_m$ to the torque sensor measurement $\tau_s$. This transfer function is $G_p$. The transfer function $G_p$ can also be computed by analytically modelling the system;
2) Calculate the maximum assist curve gain $S_{c1}$;
3) Plot the gain and phase for the transfer function $S_{c1}G_p$ for $S_{c1}$ maximum.
4) Design a filter $G_f$ such that the open loop transfer function of the steering system $S_{c1}G_pG_f$ has the desired open loop crossover frequency and sufficient gain and phase stability margins for the case of $S_c$ being maximum, i.e., $S_c = S_{c1}$. The open loop crossover indicates how responsive the system will be. In accordance with a preferred embodiment of the present invention, the filter $G_f$ is:

$$G_f = \frac{(S+40)^2}{(S+4) \times (S+400)}$$

This filter in combination with a system gain of 5 produces an open loop crossover frequency $w_c$ of 32 Hz.
5) Construct the adaptive portion of the filter to keep the 0 db crossover point (or bandwidth) constant. As the gain $S_c$ reduces, the open loop crossover will decrease unless the filter $G_f$ is modified. The adaptive portion of the filter $G_1$ does the following: any gain reduction caused by $S_c$ being less than 5 is recovered by increasing the frequency of the pole located at 4 rad/sec in $G_f$. In a preferred embodiment of the invention, filter $G_1$ is:

$$G_1 = \frac{(S+4)}{(S+P)} \times \frac{P}{4}$$

The gain in db of a first order filter with a pole at P and a time constant T=1/P at a frequency w is:

gain of pole=$-20 \log_{10}(1+w^2T^2)^{1/2}$

The gain reduction due to the steering system having a gain of $S_c$ rather than 5 is:

gain reduction=$20 \log_{10}(S_c/5)$

The adaptive pole P is moved so that the difference in gain due to the pole moving from 4 rad/sec to P rad/sec is equal and opposite to the gain induced by the assist curve gain $S_c$ changing from 5 to $S_c$.

FIGS. 7A and 7B shows the Bode plot adaptive filter for various steering system gains. Arrows 210 and 220 show the direction of increasing gain. The transfer function $G_1G_f$ is plotted. All of the filters have unity DC gain. However, as $S_c$ decreases from 5 to 1, the gain of the adaptive portion of the filter $G_1$ increases at a frequency 32 Hz. Hence, the filter $G_1$ recovers the gain loss due to $S_c$ changing to therefore achieve a constant bandwidth open loop plant.

Those skilled in the art will appreciate that this adaptive torque filter will maintain a selectable system bandwidth independent of vehicle speed and assist curve gain changes.

From the above description of preferred embodiments of the invention, those skilled in the art will perceive improvements, changes and modifications. Such improvements, changes and modifications within the skill of the art are intended to be covered by the appended claims.

Having fully described the invention, the following is claimed:

1. An apparatus for controlling a steering assist system, said steering assist system providing assist in response to a steering control signal, said apparatus comprising:

torque sensing means operatively connected to a vehicle hand wheel for providing a torque signal indicative of applied steering torque;

steering assist means for providing steering assist in response to a control signal; and control means operatively connected to said torque sensing means for providing said control signal to said steering assist means in response to said torque signal, said control means including torque filtering means for filtering said torque signal so as to maintain a selectable system bandwidth during system operation.

2. The apparatus of claim 1 wherein said control means further includes means for adapting poles and zeros of said filtering means to have the system bandwidth independant of vehicle speed and input torque.

3. An apparatus for controlling a steering assist system, said steering assist system providing assist in response to a steering control signal, said apparatus comprising:

vehicle speed sensing means for sensing vehicle speed and for providing a speed signal having a value indicative of the sensed vehicle speed;

torque sensing means operatively connected to a vehicle hand wheel for providing a torque signal indicative of applied steering torque;

steering assist means for providing steering assist in response to a control signal; and control means operatively connected to said vehicle speed sensing means and to said torque sensing means for providing said control signal to said steering assist means in response to said vehicle speed and applied steering torque, said control means including torque filtering means for filtering said torque signal so as to maintain a selectable system bandwidth during system operation.

4. The apparatus of claim 3 wherein said control means further includes means for modifying said filtering means in response to vehicle speed.

5. The apparatus of claim 3 wherein said adaptive portion of the filtering means includes a first order filter.

6. A method for controlling a steering assist system that provides steering assist in response to a steering control signal, said method comprising the steps of:

measuring applied steering torque;

providing steering assist in response to a steering control signal;

filtering said torque signal so as to maintain a selectable steering assist system bandwidth during system operation; and providing the control signal in response to the filtered torque signal.

7. The method of claim 6 wherein said step of filtering includes modifying said filtering means in response to vehicle speed.

8. A method for controlling a steering assist system that provides steering assist in response to a steering control signal, said method comprising the steps of:

sensing vehicle speed and providing a speed signal having a value indicative of the sensed vehicle speed;

sensing applied steering torque and providing a torque signal indicative of applied steering torque;

filtering said torque signal so as to maintain a selectable system bandwidth during system operation; and providing said control signal to said steering assist means in response to said vehicle speed and said filtered torque signal.

9. The method of claim 8 wherein said step of filtering is responsive to vehicle speed.

10. A method for designing an adaptive filter for an electric assist steering system having a torque sensor connected to a controller which is, in turn, connected to an electric assist motor, said method comprising the steps of:

applying a command signal to an electric assist motor in an open loop configuration;

measuring an open loop transfer function as a result of the applied command signal to the motor;

determining the maximum assist curve gain; and designing a filter such that the open loop transfer function of the steering system has a predetermined (i) open loop crossover frequency, (ii) gain, and (iii) phase stability margin.

11. The method of claim 10 wherein said step of designing a filter includes the step of designing a filter $G_f$ in accordance with $$G_f = \frac{(S+40)^2}{(S+P)(S+400)} \times \frac{P}{4}$$

12. An apparatus for controlling a steering assist system, said steering assist system providing assist in response to a steering control signal, said apparatus comprising:

torque sensing means operatively connected to a vehicle hand wheel for providing a torque signal indicative of applied steering torque;

steering assist means for providing steering assist in response to a control signal; and control means operatively connected to said torque sensing means for providing said control signal to said steering assist means in response to said torque signal, said control means including torque filtering means for filtering said torque signal so as to maintain a selectable system bandwidth during system operation, and further including means for providing a desired output torque value as a function of applied input torque and for modifying said filtering means in response to a rate of change of desired output torque with respect to applied input torque.

13. An apparatus for controlling a steering assist system, said steering assist system providing assist in response to a steering control signal, said apparatus comprising:

vehicle speed sensing means for sensing vehicle speed and for providing a speed signal having a value indicative of the sensed vehicle speed;

torque sensing means operatively connected to a vehicle hand wheel for providing a torque signal indicative of applied steering torque;

steering assist means for providing steering assist in response to a control signal; and control means operatively connected to said vehicle speed sensing means and to said torque sensing means for providing said control signal to said steering assist means in response to said vehicle speed and applied steering torque, said control means including torque filtering means for filtering said torque signal so as to maintain a selectable system bandwidth during system operation, and further including means for providing a desired output torque value as a function of applied input torque and for modifying said filtering means in response to a rate of change of desired output torque with respect to applied input torque.

14. An apparatus for controlling a steering assist system, said steering assist system providing assist in response to a steering control signal, said apparatus comprising:

vehicle speed sensing means for sensing vehicle speed and for providing a speed signal having a value indicative of the sensed vehicle speed;

torque sensing means operatively connected to a vehicle hand wheel for providing a torque signal indicative of applied steering torque;

steering assist means for providing steering assist in response to a control signal; and control means operatively connected to said vehicle speed sensing means and to said torque sensing means for providing said control signal to said steering assist means in response to said vehicle speed and applied steering torque, said control means including torque filtering means for filtering said torque signal so as to maintain a selectable system bandwidth during system operation, said filter means including an adaptive filter defined by $$(G_f)_{adaptive} = \frac{(S+40)^2}{(S+4)(S+400)} \times \frac{(S+4)}{(S+P)} \times \frac{P}{4}.$$

15. The apparatus of claim 14 wherein said control means includes means for offsetting system gain reductions by changing frequency of a pole located at P rad/sec in $G_f$.

16. An apparatus for controlling a steering assist system, said steering assist system providing assist in response to a steering control signal, said apparatus comprising:

vehicle speed sensing means for sensing vehicle speed and for providing a speed signal having a value indicative of the sensed vehicle speed;

torque sensing means operatively connected to a vehicle hand wheel for providing a torque signal indicative of applied steering torque;

steering assist means for providing steering assist in response to a control signal; and control means operatively connected to said vehicle speed sensing means and to said torque sensing means for providing said control signal to said steering assist means in response to said vehicle speed and applied steering torque, said control means including torque filtering means for filtering said torque signal so as to maintain a selectable system bandwidth during system operation, said filtering means being established by measuring an open loop system transfer function.

17. A method for controlling a steering assist system that provides steering assist in response to a steering control signal, said method comprising the steps of:

measuring applied steering torque;

providing steering assist in response to a steering control signal;

filtering said torque signal so as to maintain a selectable steering assist system bandwidth during system operation; and providing the control signal in response to the filtered torque signal including providing a desired output torque value as a function of applied input torque and modifying said filtering step in response to a rate of change of desired output torque with respect to applied input torque.

18. A method for controlling a steering assist system that provides steering assist in response to a steering control signal, said method comprising the steps of:

sensing vehicle speed and providing a speed signal having a value indicative of the sensed vehicle speed;

sensing applied steering torque and providing a torque signal indicative of applied steering torque;

filtering said torque signal so as to maintain a selectable system bandwidth during system operation; and providing said control signal to said steering assist means in response to said vehicle speed and said filtered torque signal including providing an output torque value as a function of applied input torque and modifying said filtering step in response to a rate of change of the output torque value with respect to the applied input torque.

19. A method for controlling a steering assist system that provides steering assist in response to a steering control signal, said method comprising the steps of:

sensing vehicle speed and providing a speed signal having a value indicative of the sensed vehicle speed;

sensing applied steering torque and providing a torque signal indicative of applied steering torque;

filtering said torque signal so as to maintain a selectable system bandwidth during system operation, said filtering being performed in accordance with $$(G_f)_{adaptive} = \frac{(S+40)^2}{(S+4)(S+400)} \times \frac{(S+4)}{(S+P)} \times \frac{P}{4}$$

providing said control signal to said steering assist means in response to said vehicle speed and said filtered torque signal.

20. The method of claim 19 further including the steps of offsetting system gain reductions by changing frequency of a pole located at P rad/sec in $G_f$.

* * * * *